May 14, 1935.  F. W. JACKMAN  2,001,682
SUBMARINE CAMERA
Filed July 5, 1932  2 Sheets-Sheet 1
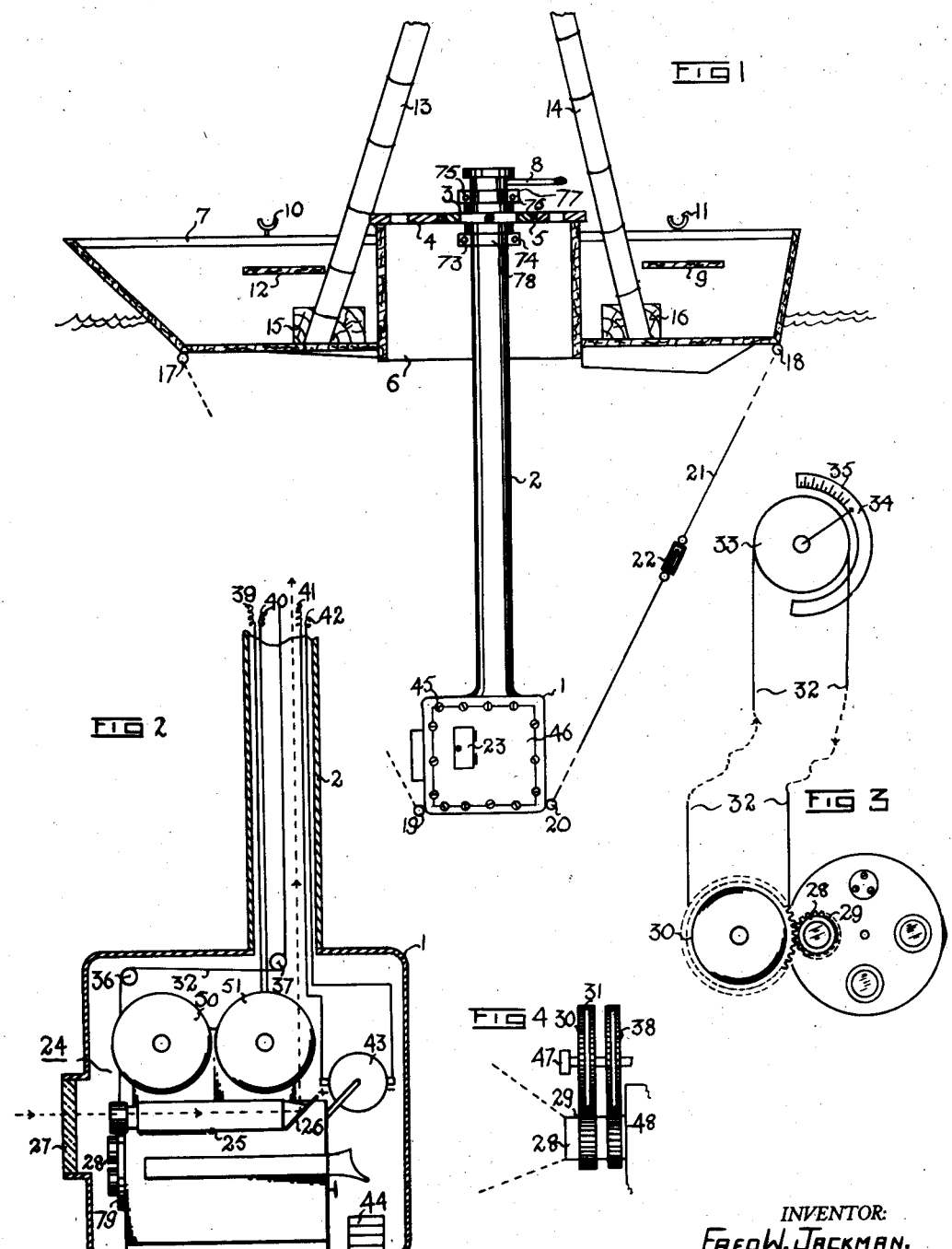
INVENTOR:
FRED W. JACKMAN.
BY W. E. Beatty
ATTORNEY.

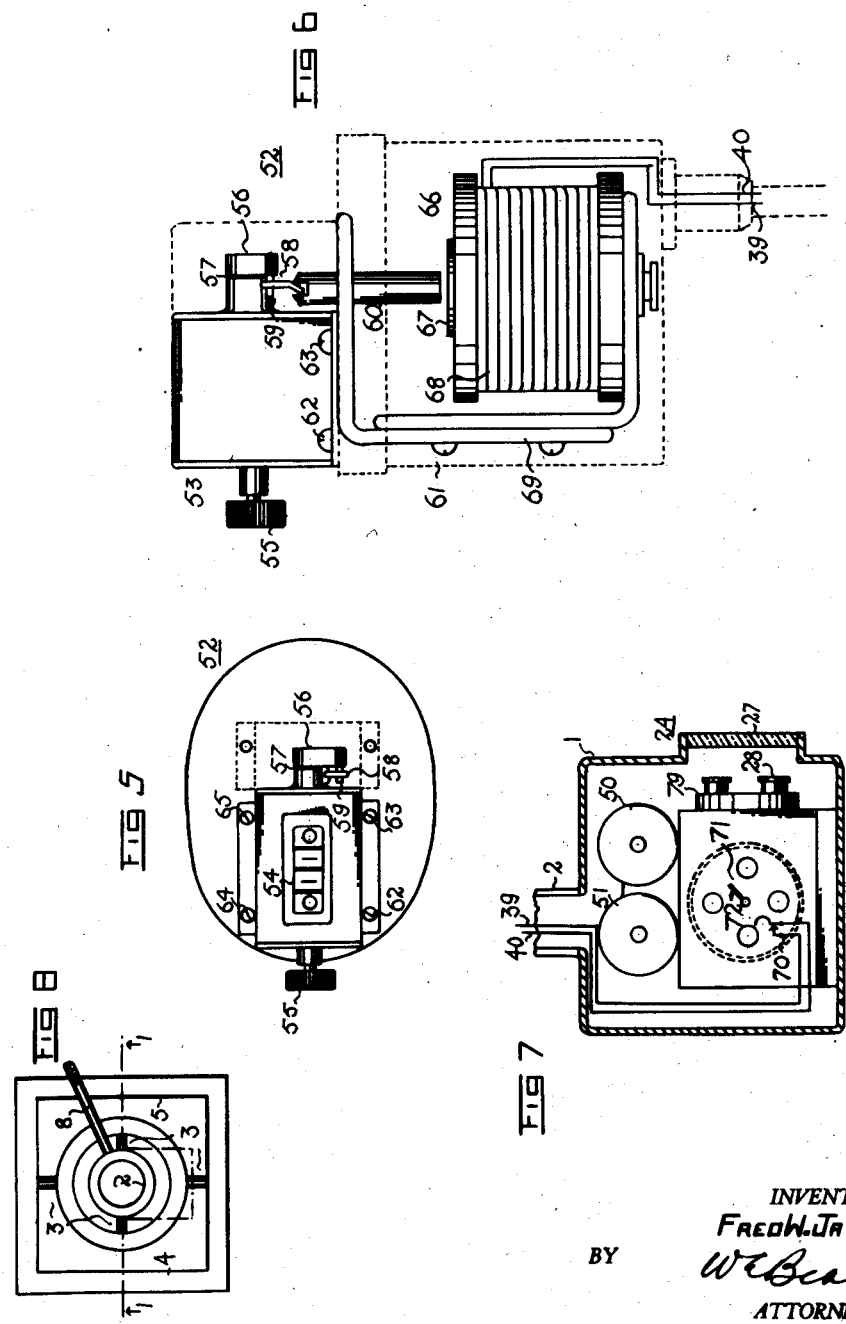

Patented May 14, 1935

2,001,682

UNITED STATES PATENT OFFICE 2,001,682

SUBMARINE CAMERA

Fred W. Jackman, Beverly Hills, Calif., assignor to Warner Bros. Pictures, Inc., New York, N. Y., a corporation of Delaware Application July 5, 1932, Serial No. 620,825

2 Claims. (Cl. 88—16)

The invention relates to apparatus for taking submarine motion pictures by means of a submerged motion picture camera.

It has heretofore been proposed to take submarine motion pictures by means of a special camera built in an elongated barrel with the film running its full length and a film magazine therefor located above the water. This construction has several disadvantages, in particular the disadvantage of requiring a special camera construction which is costly to build.

An object of the present invention is to use standard motion picture camera equipment for taking submarine photographs. This is accomplished by mounting the camera in a water-tight casing having a connecting tube which extends above the water line, the casing and its tube being mounted in the well of a boat whereby the casing may be raised into the boat to change the film supply and take-up reels.

The above mentioned camera of the prior art, and other prior submarine cameras, have the defect that when making shots when the boat is not under way, a rocking movement of the boat due to the waves causes a rocking movement of the camera, whereas it should be stationary. It has been discovered that this is due to a thrust on the camera support due to an inequality of the weight of the camera casing and tube and the contents thereof with respect to the weight of the water displaced by the camera casing and tube.

A further object of the invention is to prevent the rocking movement of the camera under the conditions above mentioned. This is accomplished by employing a buoyant submersible camera casing, with a gimbal support connected thereto at a point so that the casing freely floats. Under these conditions the rocking movement of the boat will not be imparted to the camera.

In order that motion pictures may be taken at different depths and without the rocking movement of the boat being imparted to the camera, the camera casing is vertically adjustable in the boat and also weights are added to the camera casing so that the camera casing freely floats at the desired depth in the water.

Another object of the invention is to take running submarine shots while preventing the camera from vibrating or from moving out of a horizontal position when the boat is in motion. This is accomplished by lashing the camera to the boat and by employing a casing and camera of substantial weight thereby providing a large moment of inertia which resists vibration in the water.

Another object of the invention is to view from a position in the boat, the underwater field to be photographed, to indicate at a point in the boat, the amount of film that has been used, and to alter from a position in the boat and while the camera is submerged, the focus and stop adjustments. These objects are accomplished respectively by providing a mirror adjacent the camera viewfinder whereby the field therein is reflected to a point in the boat, by providing in the boat a footage meter operated by the camera mechanism and by providing a remote control apparatus in the boat whereby the focus and stop may be adjusted.

Further details of this invention will be apparent from the following description, when read in conjunction with the accompanying drawings wherein:

Fig. 1 is a side elevation, partly in cross section, showing the water-tight casing of this invention and means for suspending it from a rowboat.

Fig. 2 is a side elevation, partly in cross section, showing the camera housed inside the water-tight casing and the various electrical and mechanical connections with the surface above.

Fig. 3 is a schematic view showing a means of altering the focus of the camera at a point distant therefrom.

Fig. 4 is a plan view of a preferred means for altering the focus and stop of the camera.

Fig. 5 is a plan view of the footage meter.

Fig. 6 is a side elevation of the footage meter with its outer case removed.

Fig. 7 is a side elevation, partly in cross section, showing a preferred means of actuating the footage meter.

Fig. 8 is a plan view of the gimbal support.

When motion pictures are to be taken of submarine objects, such as fishes or plants, it is necessary that the camera remain perfectly steady so that when the final picture is produced, the rocking of the boat supporting the camera will not be apparent. In order to accomplish this, the present invention provides a heavy metal casing 1 that is connected by means of a tube 2 to a gimbal joint 3. Gimbal joint 3 is mounted on a frame having portions 4 and 5 fastened to the top of an open well 6 in the center of a rowboat 7. A handle 8 is attached to the upper end of the tube 2 so that it may be conveniently turned in any desired direction, the gimbal joint allowing this freedom of movement as is well understood.

Rowboat 7 is provided with seats 9 and 12 and oarlocks 10 and 11 adjacent thereto so that the boat may be rowed. A hoisting tripod, two arms of which are shown at 13 and 14, rests in supporting blocks 15 and 16 and supports a block and tackle (not shown) above the tube 2. This block and tackle may be used for raising or lowering the camera casing into or out of the well of the boat.

Weights 44 are placed in the bottom of the case 1 so that the weight of the case 1 and the parts therein will equal the weight of the water displaced thereby and will not reflect the movement of the boat, due to the waves, etc. Weights 44 may be placed in the casing 1 by means of a door 23, in the side of casing 1. The weights 44 are varied in accordance with the depth at which it is desired to photograph so that the tube 2 is buoyed up the desired amount, the screws 73, 74, 75 and 76 being loosened in their respective collars 77 and 78 to permit vertical adjustment of tube 2 in the gimbal, and then tightened when tube 2 comes to rest at the proper height.

The total weight of the device without any counter weights is approximately 125 lbs. This total weight being varied, of course, according to the number of weights 44 which are added.

It will be understood that the gimbal 3 is connected to tube 2 at a point where the tube 2 and casing 1 with its contents will freely float in the water.

The bottom of the boat 7 is provided with four spaced rings such as 17 and 18. The camera casing 1 is provided at each of its four corners with corresponding rings, such as 19 and 20. Rings 18 and 20 are shown joined by a wire cable 21 with a turn buckle 22, for imparting any desired tension between the two rings. A similar arrangement is provided for the other rings (not shown) so that the camera case 1 may be immovably fastened relative to the rowboat 7 for running shots.

A door (not shown) similar to door 23 is provided for the side of the casing 1 opposite side 46 so that the lens turret 79 of the camera 24 may be rotated by hand. Camera 24 can be of any standard make. The one shown has a viewfinder 25 fastened to the side thereof. A mirror 26 is attached to the eye-piece end of the viewfinder 25 and directs light rays at right angles thereto, so that the field of view to be photographed may be observed from the surface of the water by looking down the tube 2. For this purpose any suitable binocular eye-piece may be introduced if necessary.

Camera 24 is horizontally disposed in casing 1, as shown, and the whole assembly is hoisted above the water line by the block and tackle (not shown) for changing the supply and take-up reels 50 and 51.

A heavy, optical glass window 27 is let into the casing in front of the lens barrel 28 of the camera 24. Attached to the lens barrel 28 is a pinion gear 29 (Figures 3 and 4) which meshes with a larger gear 30. Gear 30 has an annular groove 31 in which rides an endless wire cable 32 that actuates a corresponding pulley 33 located at any convenient point (not shown) in the boat 7.

A pointer 34, attached to the wheel 33, cooperates with a scale 35 which is calibrated to show the focus adjustment of the lens 28. The connections between the lens 28 and the boat 7 are schematically shown in Fig. 2, as two pulleys 36 and 37 around which the wire 32 rides.

The gear 30 is journaled for free rotation on a stub shaft 47 (Fig. 4). There is a similar arrangement provided for the stop device 48 of the lens 28 by means of a gear 38, similar to the gear 30, which is also journaled on the stub shaft 47 for free rotation.

A scale and pointer (not shown) similar to 34 and 35 are provided for indicating the adjustment of the camera stop. The electrical connections 39 and 40 actuate a footage meter 52 (Figures 5 and 6) conveniently located at the upper end of tube 2.

Meter 52 which may be mounted at any convenient point in the boat 7, consists of any well-known form of counter 53 having a visible scale 54 and a knob 55 for returning the variable scale to its initial position, as is well understood. Counter 53 is mounted by means of the screws 62, 63, 64, 65 on casing 61.

A lever arm 56 is attached to the operating shaft 57 of the counter 53. A protruding pin 59 is fastened to the opposite end of arm 56. A connecting link 58 is journaled at one end to the pin 59 and at its other end to a pendant iron bar 60. Bar 60 passes through an aperture (not shown) in a protective casing 61.

Inside of casing 61 is a solenoid magnet 66 having a core 67 and windings 68, as is well understood in the art.

Magnet 66 is supported by a U-shaped bracket 69 suitably fastened inside the casing 61.

The bar 60 depends directly above the core 67 so that when magnet 66 is energized, bar 60 is drawn towards core 67 and depresses the lever arm 56 which registers six inches of film on the counter 53. The arm 56 is returned to its initial position by a spring (not shown) in the counter 53 as is well understood.

Connections 39 and 40 are led to a contact switch 70 located adjacent the hand cranking gear 71 of the camera 24.

A rotating contact arm 72 is attached to the gear 71, which closes the switch 70 once every revolution and energizes the solenoid magnet 66 and actuates the counter 53. Thus, it will be seen that an accurate check may be kept of the film footage that has been exposed in the camera.

Electrical connections 41 and 42 (Fig. 2) for the camera motor 43 are connected to a switch (not shown) on the boat 7. Any suitable power source (not shown) may be provided for energizing the various electrical circuits.

When it is desired to remove the camera from the casing 1 screws 45 may be removed and a panel 46 lifted out (Fig. 1).

The doors of the casing 1 are made water-tight by any well-known means, such as rubber washers or gaskets.

Thus, it will be seen that a camera is provided for taking submarine effects which will not reflect the movements of a boat from which it is suspended and so clear and steady pictures may be obtained; also a camera whose focus and stop may be altered from the surface while the camera is submerged; a camera from which the footage of exposed film may be observed from a point distant therefrom; a device from which the scene actually being photographed may be watched during the photographing thereof and a camera that may be lashed relative to a boat so that running shots may be taken.

It will be apparent that various modifications may be made without departing from the spirit of the invention.

Having thus described the invention, what is claimed as new and desired to secure by Letters Patent is:

1. A submarine motion picture camera arrangement comprising the combination of a boat, a well therein, a gimbal bearing mounted on said boat adjacent said well, a tube depending from said bearing, a casing connected to the lower end of said tube and containing therein a motion picture camera with its film supply and take-up reels, the size of said well being sufficient to permit hoisting said tube and said casing above the water line to change the film supply and take-up reels in said casing.

2. A submarine camera comprising the combination of a submersible camera casing having an elongated tube connected thereto adapted to project above the water line, a motion picture camera in said casing, means within said tube and extending above the water line for operating said camera, and a gimbal support connected to said tube substantially at a point such that the weight of said casing, tube and contents is equal to the weight of the water displaced thereby.

FRED W. JACKMAN.